Aug. 22, 1944.  C. G. CLARKE  2,356,383

MEANS FOR MAKING COMPOSITE PICTURES

Filed Aug. 23, 1941

INVENTOR
CHARLES G. CLARKE
BY
Robt. L. Gunn
ATTORNEY

Patented Aug. 22, 1944

2,356,383

UNITED STATES PATENT OFFICE 2,356,383

MEANS FOR MAKING COMPOSITE PICTURES

Charles Galloway Clarke, Palms, Calif., assignor to Twentieth Century-Fox Film Corporation, Los Angeles, Calif., a corporation of New York Application August 23, 1941, Serial No. 408,104

2 Claims. (Cl. 88—16)

This invention relates to photography and deals particularly with an attachment for producing composite cloud effects in still photography or motion pictures. Although the description of the invention herein will be directed toward cinematography, it is to be understood that it is equally applicable to still photography.

To those versed in the art of cinematography, it is well known that cloud effects are one of the most uncertain elements of exterior photography. It is seldom that an exterior shot can be made with the desired natural cloud effect. The result has been that cinematographers have been called upon to make shots having a bald sky, when it is almost a certainty that a cloud filled sky will be demanded later. In order to supply the missing clouds, the films have been treated by the Special Effects Department and cloud effects have been duped in. This, however, has proved expensive and inefficient, since it caused delay and necessitated a considerable amount of highly skilled technical work.

The present invention deals with a means for photographing composite clouds into exterior scenes during the actual shooting of the scene. The device itself is light, portable, inexpensive, and is mounted upon the tripod, or the camera support, so that it may be moved about from place to place as readily and as easily as the camera itself. It requires no set-up outside of setting up the camera.

In practice, I use a transparency which is placed a short distance in front of the photographic lens and is held in a bracket, which in turn is mounted upon the camera support below the free-head of the camera so that the bracket itself does not move when the camera is panned or tilted. The transparency itself may be a flexible film or plate slidably mounted in the bracket and carries clouds in the upper portion, while the lower portion is left clear to photograph the action and the clouds are dodged off to blend with the horizon. Under this arrangement the bald sky becomes a printing light by which the clouds are photographed directly upon the same film as the scene. Of course the clouds are not in focus but the lack of definition only assists in making the effect realistic.

In conjunction with the above mentioned bracket, I mount the camera on the support so that it will turn upon the nodal point of the lens. This allows panning shots to be made with no relative movement between the clouds and the rest of the picture.

In using my device, I use several types of transparencies and select the transparency for each shot according to the type of lighting used in the shot; that is, for a front lighted shot I used a front lighted transparency, while for a back lighted shot I use a back lighted plate, etc. With these transparencies I am enabled to select the proper cloud effect for any shot, and once having selected the cloud effect for a shot I may duplicate the same effect for retakes or consecutive shots, thereby eliminating the difficulty of matching transient cloud effects in duplicate shots that are made in the same day or on different days. The device really becomes a part of the camera support, so that it is readily accessible to the cameraman for manipulation and use. Means are provided for easily and rapidly mounting the device upon the camera support, and means are also provided for readily inserting, removing, or adjusting the position of the cloud transparency in the bracket. As a further refinement, I prefer to mount the transparency itself in an arc whose center is the nodal point of the lens and provide means for sliding the transparency in the circumference so that the cloud effect desired to match the background and horizon may be adjusted into proper position in front of the camera lens. In addition, the length of the plate may be increased to accommodate wide angle lenses and provide for wide panning shots.

Other objects and advantages will appear as the description proceeds in conjunction with the drawing in which.

Briefly stated, the invention amounts to photographing a scene through a plate which is positioned close to the camera lens and which carries the desired cloud effect in the upper portion thereof. Under this set-up it is evident that the plate itself will not be in focus, since the lens is focused upon the subject matter to be photographed, but in practice this does not interfere with the realistic effect of the clouds.

Figure 1:
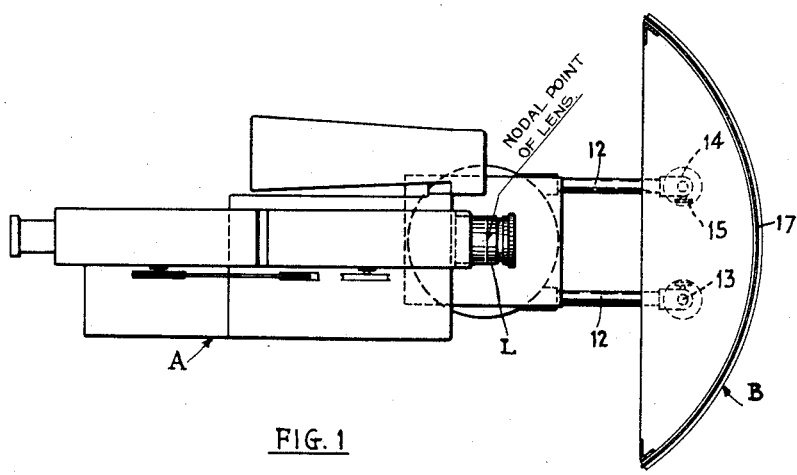
Figure 1 is a top plan view of a motion picture camera having my invention installed thereon and shown in section.
Figure 2:
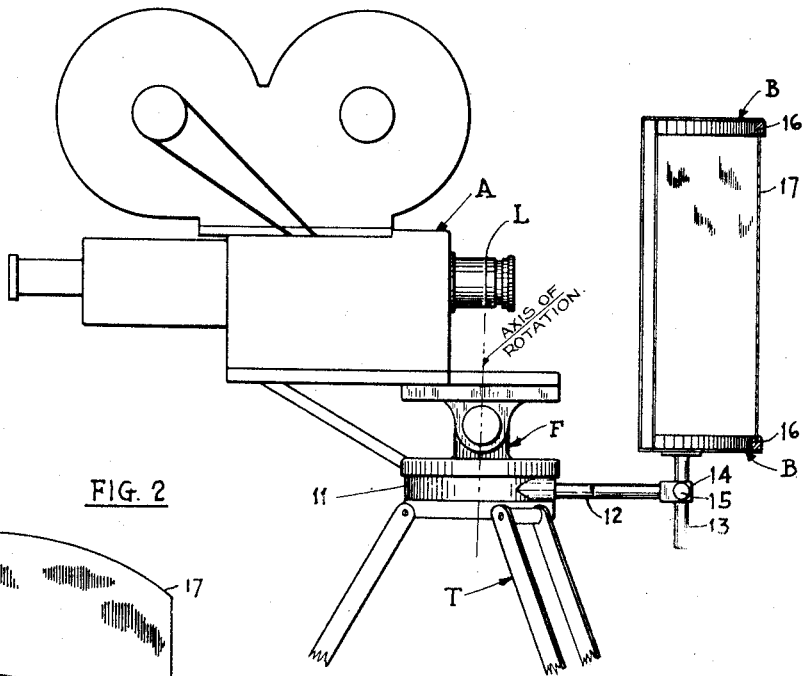
Figure 2 is an elevation of the same, showing my invention in section.
Figure 3:
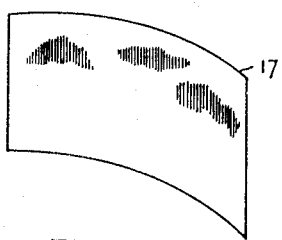
Figure 3 is a perspective view of the transparency plate used in my invention.

As shown in Figures 1 and 2, I may use my invention in conjunction with a motion picture camera generally designated A, which is conventionally mounted upon a tripod T. Although I have shown a tripod in this instance, any other support, such as a camera carriage, will serve equally as well. Between the camera and its support, there is usually employed a free-head F, which provides a universal movement between the camera and its support. By the term "free-head" is meant a mounting which yields rotary movements in two directions at right angles to each other. These two movements provided by the free-head are usually termed a panning movement and a tilting movement, the panning movement being the movement of the camera in the horizontal plane, and the tilting movement being the movement of the camera in the vertical plane.

The free-head F is mounted upon the camera support in any conventional manner, and may comprise a ring section 11 screw-threadedly mounted upon the tripod T. In conjunction with the camera support T and the free-head F, I mount a means for photographing composite clouds. The means as shown comprises a pair of rods 12, which in turn are detachably mounted upon the ring 11 in any suitable manner, and support at the outer ends a bracket generally designated B. The bracket B is adjustably supported upon the outer ends of the rods 12 by means of short shafts 13 which slide through eyelets 14 in the ends of the rods. A pair of set screws 15 is provided for clamping the shafts 13 at any desired position in the eyelets 14. The bracket B is formed with top and bottom guide runners 16, which are slotted to slidably receive the edges of a transparency plate 17. As best shown in Figure 1, the transparency 17 is inserted in the bracket B through slots in the ends of the bracket. Under this arrangement the transparency may be slid into any desired position in the bracket, and may be adjusted to bring the desired cloud effect over any particular part of the scene actually being photographed. As will be noted in Figure 1 particularly, the transparency is wider than necessary to accommodate the covering angle of a lens. This is for the purpose of panning, which will be hereinafter explained.

The transparency itself, in its preferred form, is a photographic enlargement of a cloud scene and may consist of a flexible sheet or film having the clouds in the upper portion. The lower portion is left clear for photographing the actual scene and the clouds are dodged off to blend with the horizon. With this set-up the clouds are actually photographed in the foreground, while the action scene which is usually termed the foreground becomes the background. In forming these transparencies, it has been found that attention must be given to the lighting on the clouds. For instance, if the action scene to be photographed is a back lighted scene, then the clouds to be incorporated in the scene must also be back lighted, and the same is true for front lighted scenes. Also, it has been found that the cloud effect may be enhanced by using graduated filters for controlling the lighting upon the clouds and the scene to be photographed. After the transparency has been installed, it is obvious that the scene may be photographed in the conventional manner and that the sky becomes the source of light for printing the clouds upon the same film as the scene. For retakes it is merely a matter of using the same plate to insure that the clouds will match other shots already made.

As stated hereinbefore, the means for supporting the bracket B is mounted upon the camera support below the free-head or, in other words, the bracket supporting means is mounted upon the camera support so that it will not move with the camera, but remains fixed with the support at all times. This is for the purpose of permitting panning shots. However, in order to accomplish a panning shot with this set-up, the camera must be made to turn on the nodal point of the lens. As shown in Figures 1 and 2, I have mounted the camera A so that when the camera is rotated on the free-head F, the lens L will turn upon its nodal point. This provides means whereby the camera A may be swung in a horizontal plane to take a panorama shot and, so long as the covering angle of the lens falls within the area covered by the transparency 17, the clouds will remain fixed in the picture. The resulting shot would be a panning shot having artificial clouds photographed at the same time the scene is shot.

A means of the foregoing nature has been found to produce clouds in pictures which otherwise would have bald skies, and has resulted in a considerable saving in cinematography both in delay and cost.

I claim:

1. For use in photography a support for a camera, means for rotatably mounting a camera upon said support so that the camera rotates substantially on the nodal point of the camera lens, a bracket rigidly mounted on said support, said bracket being curved to fit a circumference having its center at the nodal point of the camera lens, and means for mounting a transparency in said bracket.

2. For use in photography a support for a camera, means for rotatably mounting a camera upon said support so that the camera rotates substantially on the nodal point of the camera lens, a bracket rigidly mounted on said support, said bracket being slotted to slidably receive a transparency and curved to fit a circumference having its center at the nodal point of the camera lens.

CHARLES GALLOWAY CLARKE.